United States Patent [19]

Grimm

[11] Patent Number: 4,909,364

[45] Date of Patent: Mar. 20, 1990

[54] LATCHING FAILURE DETECTION MECHANISM FOR ROTARY DRIVE SYSTEMS

[75] Inventor: Duane H. Grimm, Rockford, Ill.

[73] Assignee: Sundstrand Corporation, Rockford, Ill.

[21] Appl. No.: 193,726

[22] Filed: May 12, 1988

[51] Int. Cl.⁴ .................. F16D 66/00; B64C 13/00
[52] U.S. Cl. ...................... 192/30 W; 192/54; 192/0.02 R; 192/67 R; 192/108; 244/75 R; 244/213
[58] Field of Search ............ 192/30 W, 54, 67 R, 192/108, 0.02 R; 244/75 R, 213; 464/160; 116/281, 283

[56] References Cited

U.S. PATENT DOCUMENTS

| | | | |
|---|---|---|---|
| 1,163,085 | 12/1915 | Hardy | 192/108 |
| 2,384,584 | 9/1945 | Wildhaber | 192/108 |
| 2,405,171 | 8/1946 | Wildhaber | 192/67 R |
| 2,699,852 | 1/1955 | Cost | 192/67 R |
| 2,941,638 | 6/1960 | Hoover | 192/0.02 R |
| 3,223,210 | 12/1965 | Schweizer | 192/0.02 R |
| 3,389,769 | 6/1968 | Bohm | 192/67 R |
| 3,701,401 | 10/1972 | Palma et al. | 188/134 |
| 4,688,744 | 8/1987 | Aldrich | 244/75 R |
| 4,779,822 | 10/1988 | Burandt et al. | 244/75 R |

Primary Examiner—Leslie A. Braun
Assistant Examiner—Nicholas Whitelaw
Attorney, Agent, or Firm—Wood, Dalton, Phillips Mason & Rowe

[57] ABSTRACT

A latching failure detection mechanism for a rotary drive system is disclosed. A pair of mating clutch jaws are provided, with each jaw torsionally connected to a respective one of a pair of input members, such as the ends of a closed loop drive line. The jaws are relatively axially and rotatably movable. The jaws are movable from a first, inoperative position wherein the jaws simply rotate with the input members and a second, latching position wherein the jaws relatively rotatably move to a latched condition in response to relative failure rotation of the input members, thereby providing a torque path through the jaws in the latching position. An indicator is provided operatively associated with a movable one of the clutch jaws for providing a positive indication that the jaws have moved to the latching position.

21 Claims, 2 Drawing Sheets

LATCHING FAILURE DETECTION MECHANISM FOR ROTARY DRIVE SYSTEMS

Field Of The Invention

This invention generally relates to a failure detection mechanism and, particularly, to such a mechanism which is incorporated in a latching device for a rotary drive system.

Background Of The Invention

Aircraft actuation systems often use closed rotary drive loops to provide redundant load paths to assure safe operation should a single failure of any one of the drive line components occur. In order to avoid extended operation with a "dormant" failure within the system, it is desirable to incorporate a mechanism which is capable of detecting any breach of the drive line integrity.

The aforesaid can be accomplished by mechanisms interposed in the drive loop to allow limited lost motion between adjacent "ends" of the drive line loop. Lost motion is provided to accommodate normal angular deflections that occur due to system load variations and accelerations. The magnitude of the lost motion is established by design so that relative motion that approaches the limit of lost motion can occur only if drive line failure has occurred. Any further relative motion beyond the design limit is prevented by mechanical means, such as clutch jaws, to allow the drive line to continue to transmit torque so that the actuation system can continue to function.

Heretofore, in the event of drive line failure, motion detectors such as electrical switches are used to alert the aircraft and/or ground crew of the "dormant" failure which otherwise would be undetectable because of the redundant load path. Unfortunately, when the lost motion parameters are used to operate shaft failure indicators, the lost motion necessary to effect indication without giving false indications of failure ("nuisance trips") may also cause undesirable dynamic interactions in the rest of the system. In the event of failure of a drive line component, the load path through the shaft failure indicator becomes critical, and the inherent backlash of the mechanism may allow destructive flight surface flutter.

This invention is directed to a new and improved failure detection system directly responsive to a latching mechanism which becomes operative upon drive line failure, to provide a positive indication of the failure and the latching means becoming functional.

SUMMARY OF THE INVENTION

An object, therefore, of the invention is to provide a new and improved latching failure detection mechanism for a rotary drive system.

Generally, the mechanism includes a pair of mating clutch jaws each torsionally connected to a respective one of a pair of input members of the rotary drive system, such as the "ends" of a shaft in a closed drive line loop. The jaws are movable from a first position wherein the jaws rotate with the input members. The jaws are relatively rotatably movable to a second, latching position in response to relative failure rotation of the input members to provide a torque path through the jaws in the latching position.

The invention includes indicating means operatively associated with at least one of the clutch jaws for providing a positive indication that the jaws have moved to the latching position, thereby being free from any lost motion built into the mechanism to accommodate normal angular deflections that occur due to system load variations and accelerations.

More particularly, the clutch jaws are annular and are mounted for relative rotatable and axial movement. The jaws have axially mating clutch faces of tooth and slot configurations, with the teeth having opposing engageable distal land portions. In normal, operative condition of the rotary drive system, the jaws are in an inoperative position wherein the land portions of the teeth of the clutch jaws abut. Upon failure within the rotary drive system, the jaws relatively rotate with the input members to a second, latching position wherein the teeth of the jaws move axially and mate within the slots of the opposing jaw in a latched condition to provide a torque path through the clutch jaws.

The clutch jaws are spring loaded to be biased toward each other, and the land portions of opposing teeth have complementarily engageable detent means. The land portions of the teeth are of sufficient width to provide lost motion to accommodate normal deflections and accelerations in the rotary drive system. Furthermore, the teeth and slots have opposing, engageable side wall portions of complementary negative rake angles to insure rapid full engagement of the clutch jaws in the latching position.

The indicating means include a movable indicating member and an actuating member. The indicating member comprises a spring loaded, button-like member movable from a cocked non-indicating position to a released indicating position. The actuating member for the spring loaded button is operatively associated with at least one of the clutch jaws for releasing the spring loaded button to its indicating position in response to movement of the clutch jaws from their inoperative to their latching positions.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
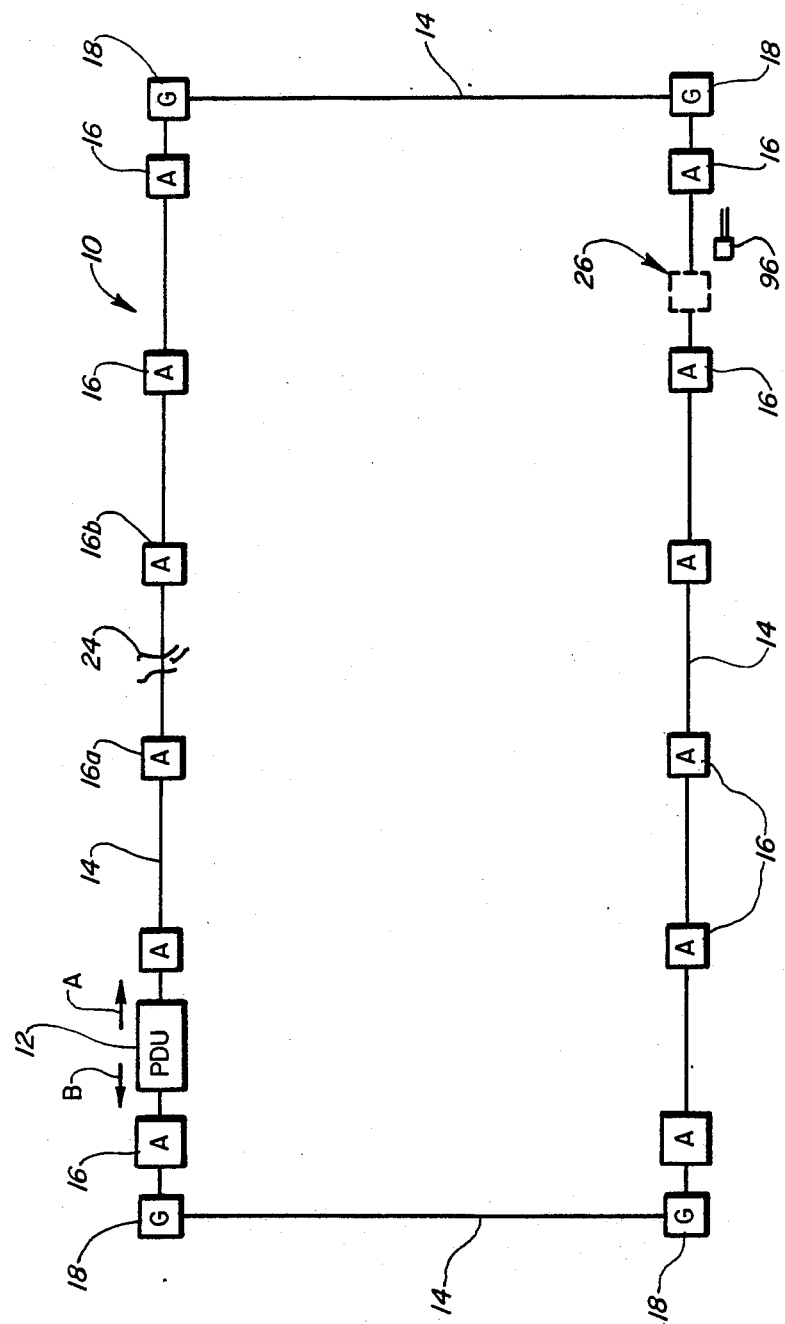
FIG. 1 is a schematic illustration of an example of a closed rotary drive system providing redundant load paths and within which the mechanism of the invention is incorporated.

Referring to the drawings in greater detail, and first to FIG. 1, a closed loop rotary drive system is shown and generally designated 10. The system includes a power drive unit 12 in a closed loop defined by a rotary drive line 14 which may comprise a series of shafts, torque tubes or the like. Such a system is used in aircraft applications to operate a plurality of actuators 16 for operating doors, leading edge flaps or other control surfaces or the like. Gear boxes 18 also may be provided in the closed loop rotary drive system.

Such rotary drive systems as illustrated in FIG. 1 are used to provide redundant load paths to insure safe operation should a single failure of any of the drive line components occur or a failure occur in the drive line itself. To better understand this concept and the general function of a failure detection device, assume that a failure occurs in the drive line at 24, between actuators 16a and 16b at the top of the illustration. Power drive unit 12 still would rotate the closed drive line loop 14 from both sides of the power drive unit, as indicated by arrows "A" and "B". In other words, rotary drive from the power drive unit still would operate actuator 16a, as indicated generally by arrow "A". Similarly, actuator 16b still would be operated by the power drive unit operating in the direction of arrow "B" completely around the opposite side of the closed drive line loop, in what is understood as a system with redundant load paths.

However, should failure 24 occur in the rotary drive system, such a failure would be unknown to the aircraft and/or ground crew because all of the actuators and other components of the system still are operational. Therefore, a failure detection mechanism, generally designated 26, is employed in the closed loop system. This mechanism would have incorporated therein some lost motion means to accommodate normal angular deflections that occur due to system load variations and accelerations. However, the magnitude of the lost motion is established by design so that the limit of lost motion is exceeded if drive line failure occurs. The failure detection mechanism therefore would give an indication or signal that a failure 24 has occurred. The failure detection mechanism should not interfere with normal operation through the drive line, i.e. there should not be any undesirable dynamic interactions in the remainder of the system.

Figure 2:
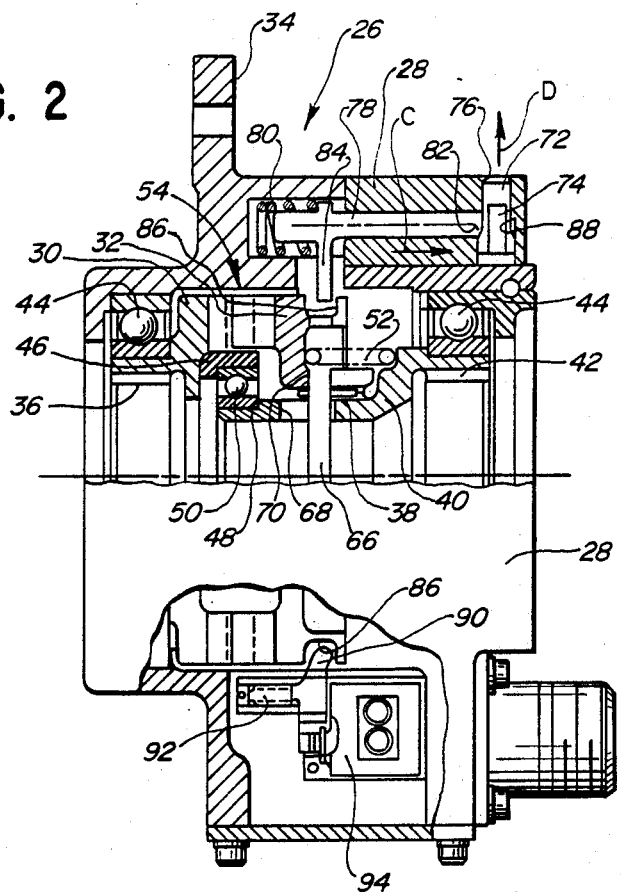
FIG. 2 is a fragmented sectional view through the latching failure detection mechanism on the invention.

FIG. 2 shows a latching failure detection mechanism incorporating the concepts of the invention and which may be employed as at 26 in FIG. 1 within the rotary drive system 10. More particularly, the latching failure detection mechanism of the invention includes a housing 28 within which is mounted a pair of mating clutch jaws 30 and 32. The housing is fixed to an appropriate support surface, as by a mounting flange 34. The mechanism is mounted so as to be incorporated in rotary drive system 10 (FIG. 1), and clutch jaw 30 has a spline connection 36 for mounting on one "end" of drive line 14 which comprises one input member to the mechanism. Clutch jaw 32 is splined, as at 38, to a short torque tube member 40, within housing 28, which, in turn, is splined at 42 to an opposing "end" of drive line 14 which forms another input member to the mechanism. In this manner, clutch jaws 30,32 rotate together with the closed drive line lop. Appropriate bearings 44 are provided to accommodate this rotation.

Clutch jaw 30 is axially fixed by means of a retainer member 46 abutting a shoulder 48 of member 40, through another bearing 50. Clutch jaw 32 can move axially in relation to the fixed jaw by means of spline connection 38 on member 40. A coil spring 52 is sandwiched between the backside of clutch jaw 32 and member 40 for biasing clutch jaw 32 toward axially fixed clutch jaw 30.

The interfacing between clutch jaws 30 and 32 is formed by a tooth and slot configuration on opposing faces of the clutch jaws, as generally indicated at 54 in FIG. 2. This tooth and slot configuration is shown in the rollout view of FIG. 3 wherein a portion of axially fixed clutch jaw 30 and axially movable clutch jaw 32 are shown. As illustrated, movable clutch jaw 32 includes a plurality of axially extending teeth 56 having a broadened distal land portion 56a and side wall portions 56b. Although a plurality of such teeth 56 project axially from clutch jaw 32 in an annular or circular array about the mating face of the clutch jaw, as seen in FIG. 2, only one tooth is shown in FIG. 3.

Axial fixed clutch jaw 30 has a plurality of teeth 56 each arranged between a pair of slots 60. Each tooth 58 has a broadened distal land portion 58a and side wall portions 58b. Of course, side wall portions 58b form the walls of adjacent slots 60. The opposite sides of slots 60 have walls 60a. A plurality of these sets of teeth 56,58 and slots 60 are disposed about the circular mating faces of opposing clutch jaws 30,32.

Figure 3:
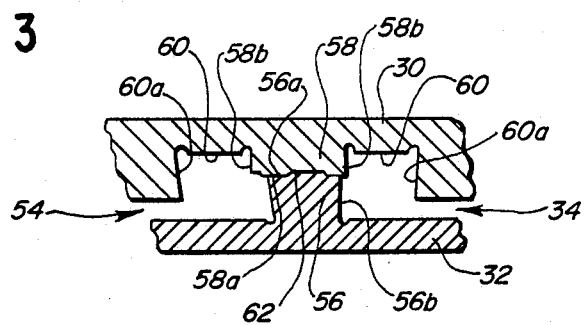
FIG. 3 is a fragmented rollout view of the tooth and slot configuration on the mating faces of the clutch of the mechanism.

During operation, i.e. during normal operation of rotary drive system 10 and closed loop drive line 14, teeth 50 and 58 are in abutting relation as shown in FIG. 3. The clutch jaws 30 and 32 simply rotate with their respective drive line "ends" to which they are spline, as described above. It can be seen that distal land portions 56a and 58a of teeth 56 and 58, respectively, are considerable broad in angular width dimensions. This provides for lost motion between the clutch jaws. In other words, the teeth lands are sufficiently wide to accommodate normal deflections and accelerations in the rotary drive system. The lost motion has to be relatively large to accommodate transient loads such as brake application. In fact, it can be seen that tooth 58 of fixed clutch jaw 30 is somewhat wider than tooth 56 of movable clutch jaw 32 in one direction. This also is part of the lost motion design to accommodate freeplay between the teeth in one accelerating direction, such as during initial actuation of a component of the system. Teeth 56,58 also are provided with complementarily interengaging detents 62 which provide a locating feature for engaging the teeth, such as in an assembly operation or during resetting of the mechanism.

Should a failure in the rotary drive system occur, as at 24 in FIG. 1, the lost motion limit provided by the distal lands of teeth 56,58 will be exceeded because of the increased torque on the closed loop drive line to which the clutch jaws are splined. When this occurs, teeth 56 will rotate relative to teeth 58, along with their respective clutch jaws, and teeth 56 will drop int one of the slots 60, under the biasing of spring 52 (FIG. 2). The tooth and slot configuration at interface 54 between the clutch jaws now provide a latching of the clutch jaws to provide a torque path therethrough. It can be seen in FIG. 3 that side walls 56b of teeth 56, side walls 58b of teeth 58 and side walls 60a of slots 60 all are provided with negative rake angles that result in an axial component of force that assists movable clutch jaw 32 to move axially and assure rapid and full engagement between the clutch jaws.

Another feature of the invention is shown in FIG. 2 wherein a cross pin 66 projects through a slot 68 in tube-like member 40 and is secured within holes 70 of movable clutch jaw 32 at opposite ends of the pin. This pin allows for resetting the device during maintenance, without disassembly, since access can be gained through tube-like member 40.

Indicating means are provided operatively associated with the clutch jaw mechanism for providing a positive indication when teeth 56,58 are engaged and a torque path is provided through the clutch jaws. More particularly, referring to FIG. 2, a button 72 is loaded by a spring 74 within a bore 76 opening to the side of housing 28. This spring-loaded button is held in a cocked position, as shown, by means of a plunger 78 which, itself, is spring-loaded by a coil spring 80 in the direction of arrow "C". The distal end of plunger 78 seats behind a shoulder 82 on button 72 to hold the button in its cocked position. The plunger has a flange or arm 84 projecting radially inwardly into an annular slot 86 on the side of movable clutch jaw 32. Therefore, when the movable clutch jaw moves into its latching position as described above, i.e. to the left in FIG. 2, the clutch jaw will engage flange 84 and move plunger 78 against the biasing of spring 80. This releases button 72, whereupon spring 74 can move the button outwardly in the direction of arrow "D". A stop 88 within bore 76 engages shoulder 82 of button 72 to define a limit for outward movement of the button. The button may be brightly colored to give a ready indication of positive engagement of the clutch faces, i.e. positive indication of drive line failure. Therefore, it can be seen that there is no undesirable dynamic interaction between the indicating means and the rest of the system. The indicating means will not be actuated unless the clutch jaws are fully engaged and provide a torque path therethrough.

A remote indicating system also may be employed and is shown at the bottom of FIG. 2. This indicating means comprises another arm 90 projecting into annular slot 86 in movable clutch jaw 32. The arm is spring loaded by a coil spring 92 which biases the arm to the position shown. When the movable clutch jaw moves into latching position, the arm moves to the left as viewed in FIG. 2, against the biasing of spring 92, an actuates a microswitch 94 which can give a signal of system failure at a remote location to which the microswitch is electrically coupled, as at 96 (FIG. 1).

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A latching failure detection mechanism for a rotary drive system, comprising:
   a pair of mating clutch jaws torsionally connected to a respective one of a pair of input members of the rotary drive system, the jaws being movable from a first position wherein the jaws rotate with the input members and a second, latching position wherein the jaws relatively rotatably move to a latched condition in response to relative rotation of the input members to provide a torque path through the jaws in the latching position; and
   indicating means actuated by at least one of the clutch jaws for providing a positive indication that the jaws have moved to the latching position.

2. The latching failure detection mechanism of claim 1 wherein said clutch jaws include tooth and slot configurations with the teeth of one jaw mating with the slots of the other jaw.

3. The latching failure detection mechanism of claim 2 wherein said teeth of the clutch jaws have distal land portions that engage to maintain the teeth out of the slots of the jaws when in said inoperative position, the teeth of one jaw moving into the slots of the other jaw when in said latching position.

4. The latching failure detection mechanism of claim 3 wherein said land portions of opposing teeth have complementarily engageable detent means.

5. The latching failure detection mechanism of claim 3 wherein said land portions are of sufficient width to provide lost motion means to accommodate normal deflections and accelerations in the rotary drive system.

6. The latching failure detection mechanism of claim 2 wherein the teeth and slots of said tooth and slot configurations include opposing, engageable side wall portions of complementary negative rake angles to insure rapid full engagement of the clutch jaws in said latching position.

7. The latching failure detection mechanism of claim 1, including spring means for biasing the clutch jaws toward each other.

8. The latching failure detection mechanism of claim 1 wherein said indicating means include a movable indicating member and an actuating member, the actuating member being operatively associated with at least one of the clutch jaws for moving the indicating member to an indicating position in response to movement of the clutch jaws from the inoperative position to the latching position.

9. The latching failure detection mechanism of claim 8 wherein said indicating member is spring loaded and movable from a cocked non-indicating position to a released indicating position by said actuating means.

10. The latching failure detection mechanism of claim 1 wherein said indicating means are spring loaded and movable from a cocked non-indicating position to a released indicating position.

11. A latching failure detection mechanism for a rotary drive system, comprising:
    a pair of annular clutch jaws mounted for relative rotatable and axial movement, the clutch jaws having axially mating clutch faces of tooth and slot configuration with the teeth having opposing engageable distal land portions, each clutch jaw being torsionally connected to a respective one of a pair of input members of the rotary drive system, the jaws being movable from a first position wherein the land portions of the teeth of clutch jaws abut and the jaws rotate with the input member, and a second, latching position wherein the jaws relatively rotate and the teeth of one jaw move axially and mate within the slots of the other jaw in a latched condition in response to relative rotational movement of the input members to provide a torque path through the clutch jaws; and
    indicating means actuated by at least one clutch jaw for providing a positive indication when the teeth mate within the slots upon relative axial movement of the clutch jaws.

12. The latching failure detection mechanism of claim 11 wherein said indicating means include a movable indicating member and an actuating member, the actuating member being operatively associated with at least one of the clutch jaws for moving the indicating member to an indicating position in response to movement of the clutch jaws from the inoperative position to the latching position.

13. The latching failure detection mechanism of claim 12 wherein said indicating member is spring loaded and movable from a cocked non-indicating position to a released indicating position by said actuating means.

14. The latching failure detection mechanism of claim 11 wherein said indicating means are spring loaded and movable from a cocked non-indicating position to a released indicating position.

15. The latching failure detection mechanism of claim 11, including spring means for biasing the clutch jaws toward each other.

16. The latching failure detection mechanism of claim 11 wherein said land portions of opposing teeth have complementarily engageable detent means.

17. The latching failure detection mechanism of claim 11 wherein said land portions are of sufficient width to provide lost motion means to accommodate normal deflections and accelerations in the rotary drive system.

18. The latching failure detection mechanism of claim 11 wherein the teeth and slots of said tooth and slot configurations include opposing, engageable side wall portions of complementary negative rake angles to insure rapid full engagement of the clutch jaws in said latching position.

19. A latching failure detection mechanism for a rotary drive system, comprising:
a pair of clutch members each torsionally connected to a respective one of a pair of input members of the rotary drive system for rotation therewith;
means operatively associated between said clutch members for latching the clutch members in response to relative rotation of the input members; and
indicating means actuated by at least one of the drive clutch members for providing a positive indication of drive system failure in response to latching of the clutch members.

20. A latching failure detection mechanism for a rotary drive system, comprising:
a pair of annular clutch jaws mounted for relative rotatable and axial movement, the clutch jaws having axially mating clutch faces of tooth and slot configurations with the teeth having opposing engageable distal land portions, each clutch jaw being torsionally connected to a respective one of a pair of input members of the rotary drive system, the jaws being movable from a first position wherein the land portions of the teeth of clutch jaws abut and the jaws rotate with the input members, and a second, latching position wherein the jaws relatively rotate and the teeth of one jaw move axially and mate within the slots of the other jaw in a latched condition in response to relative rotational movement of the input members to provide a torque path through the clutch jaws, one of said clutch jaws being axially fixed and the other of said jaws being generally hollow and axially movable;
indicating means actuated by at least one clutch jaw for providing a positive indication when the teeth mate within the slots upon relative axial movement of the clutch jaws; and
pin means extending through the hollow movable jaw for access thereto to reset the movable jaw to its inoperative position during maintenance without disassembling the mechanism.

21. A latching failure detection mechanism for a rotary drive system, comprising:
a pair of annular clutch jaws mounted for relative rotatable and axial movement, the clutch jaws having axially mating clutch faces of tooth and slot configurations with the teeth having opposing engageable distal land portions, each clutch jaw being torsionally connected to a respective one of a pair of input members of the rotary drive system,, the jaws being movable from a first position wherein the land portions of the teeth of clutch jaws abut and the jaws rotate with the input members, and a second, latching position wherein the jaws relatively rotate and the teeth of one jaw move axially and mate within the slots of the other jaw in a latched condition in response to relative rotational movement of the input members to provide a torque path through the clutch jaws one of said clutch jaws being axially fixed and the other of said jaws being generally hollow and axially movable; and
pin means extending through the hollow movable jaw for access thereto to reset the movable jaw to its inoperative position during maintenance without disassembling the mechanism.

* * * * *